United States Patent [19]

Hess, Jr. et al.

[11] 3,866,145

[45] Feb. 11, 1975

[54] TUNED OSCILLATOR CIRCUIT FOR PROVIDING A ROTATING IN-PLANE MAGNETIC FIELD

[75] Inventors: William Emil Hess, Jr., Piscataway; George Philip Vella-Coleiro, Plainfield, both of N.J.

[73] Assignee: Bell Telephone Laboratories, Incorporated, Murray Hill, N.J.

[22] Filed: Jan. 7, 1974

[21] Appl. No.: 431,504

[52] U.S. Cl. .................. 331/128, 331/166, 331/173, 340/174 TF

[51] Int. Cl. .......................................... H03b 11/08

[58] Field of Search ............ 328/223; 331/128, 165, 331/166, 173, 174; 340/174

[56] References Cited

UNITED STATES PATENTS 3,720,883 3/1973 Hess, Jr. et al. ...................... 331/55

*Primary Examiner*—John Kominiski

*Attorney, Agent, or Firm*—J. P. Kearns

[57] ABSTRACT

A high-speed, high-power, tuned oscillator circuit capable of initiating an oscillatory current at a predetermined phase point and terminating it after an integral number of oscillation cycles without producing undesirable transient ringing effects is disclosed. A pair of these oscillator circuits are synchronously cross-coupled and orthogonally arranged to provide a circuit capable of initiating a high-intensity in-plane rotating magnetic field at a predetermined phase point and terminating it after an integral number of field rotation cycles.

17 Claims, 5 Drawing Figures

TUNED OSCILLATOR CIRCUIT FOR PROVIDING A ROTATING IN-PLANE MAGNETIC FIELD

BACKGROUND OF THE INVENTION

1. Field of the Invention

This invention relates, in general, to electronic circuits, and, more particularly, to tuned oscillator circuits which are particularly suitable for providing rotating in-plane magnetic fiels in field-accessed, single wall, magnetic domain apparatus.

2. Prior Art

A large variety of apparatus have recently been proposed for performing a host of logical, arithmetic and information storage operations by controllably manipulating single wall magnetic domains in a layer of suitable material. A complete explanation of single wall domains, various operations employing the controlled movement of them, and suitable materials in which the domains are movable is provided in "Properties and Device Applications of Magnetic Domains in Orthoferrites," by A. H. Bobeck, in the *Bell System Technical Journal*, Vol. 46, No. 8, October 1967, pages 1,901 et seq.

In order to perform these operations, a simple dependable method for moving the domains about within the layer of material in response to external control stimuli is required. To meet this requirement, a variety of magnetic domain propagation circuits have been disclosed in which domains are moved between predetermined element locations in the plane of the layer of material in response to an in-plane rotating magnetic field. Examples of these propagation circuits and the mechanisms by which domains are moved about in them in response to such a field are shown and described in U.S. Pat. No. 3,534,347, assigned to Bell Telephone Laboratories, Inc., by A. H. Bobeck.

It is characteristic of these domain propagation circuits that domains move between adjacent elements in response to each complete cycle of the rotating magnetic field. This feature enables the position of each domain to be ascertained from the number of rotation cycles which have occurred following the initiation of the field. Control of the number of cycles and the phase of the rotating field is therefore important to the extent that the field must be initiated at a predetermined phase point and then terminated at the same point after an integral number of full rotation cycles.

As a result, a collateral requirement has arisen for field drive circuits for producing rotating magnetic fields meeting these criteria. Early attempts to provide such circuits resulted in various combinations of well-known oscillator circuits with Helmholtz coil structures. Unfortunately, all of these circuits suffered from high power consumption and poor phase characteristics at the field rotation frequencies required in magnetic domain apparatus. The poor phase characteristics were largely due to difficulties encountered in developing adequate switching means for terminating the rotating field without producing undesirable transient ringing effects.

In order to cure these difficulties, the tuned field drive circuit described in our U.S. Pat. No. 3,720,883, assigned to Bell Telephone Laboratories, Inc., was devised. That circuit, which incorporates the field drive coils as part of a tuned load, is capable of initiating a rotating in-plane magnetic field at a predetermined phase point and then terminating it at the same point after an integral number of field rotation cycles without creating undesirable transient ringing effects. The field drive circuit is basically comprised of two synchronously interconnected, orthogonally arranged, tuned oscillator circuits. Each oscillator circuit comprises a preenergized series L-C tuned circuit which includes a field drive coil for providing one of the two orthogonal magnetic field components which comprise the rotating magnetic field. A transistor-diode switch is connected in a loop with the tuned circuit for initiating and terminating an oscillatory field drive current therein.

Although this field drive circuit has proved to be perfectly suitable for generating magnetic fields which rotate at frequencies of the order of 500 KHz or lower, it is incapable of generating fields of the desired intensity, e.g., 25 Oersteds or more in the more sophisticated magnetic domain apparatus, which rotate at frequencies of 1 MHz or more. This is due, in large part, to the inability of the transistor-diode switch to provide the required switching speeds at the high-power levels which are required in such apparatus.

Accordingly, it is an object of this invention to provide a higher-speed, high-power, tuned oscillator circuit capable of initiating an oscillatory current therein at a predetermined phase point and terminating it after an integral number of oscillation cycles without producing undesirable transient ringing effects.

It is another object of this invention to provide a field drive circuit comprised of a pair of such oscillator circuits which is capable of initiating a high-intensity rotating magnetic field at a predetermined phase point and terminating it at the same phase point after an integral number of field rotation cycles.

DETAILED DESCRIPTION OF THE DRAWING

SUMMARY OF THE INVENTION

The invention lies in a high-speed, high-power, tuned L-C oscillator circuit which is capable of initiating an oscillatory current therein at a predetermined phase point and terminating it at the same point after an integral number of oscillation cycles. A first charged capacitor, having a first predetermined value relative to the tuned circuit capacitor is switched into a closed loop with the tuned circuit. The precise amount of energy required to initiate an oscillatory current of a predetermined frequency, phase and amplitude is immediately transferred from the first capacitor to the tuned circuit capacitor and oscillation is initiated. When the oscillation is to be terminated, a second charged capacitor, having a second predetermined value relative to the tuned circuit capacitor, is switched into a closed loop with the tuned circuit at a predetermined point in the oscillation cycle. All of the oscillation energy is immediately extracted from the tuned circuit and the oscillation is immediately terminated therein without producing undesirable transient ringing effects.

Two of the oscillator circuits are synchronously cross-coupled together in an orthogonal arrangement to produce the two orthogonal magnetic field components which comprise a rotating in-plane magnetic field of the type required in field-accessed, single wall, magnetic domain apparatus.

DETAILED DESCRIPTION OF THE INVENTION

Figure 1:
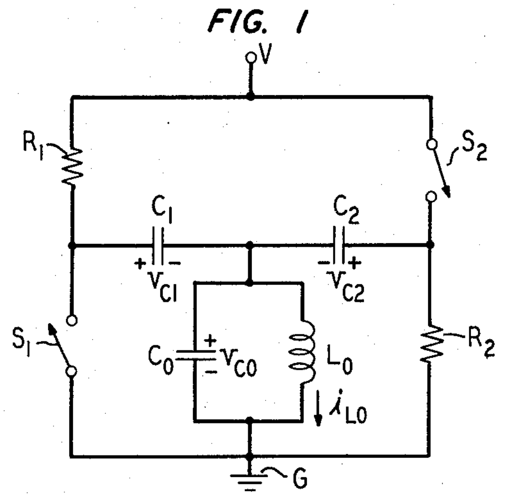
FIG. 1 depicts a basic schematic diagram of a high-speed, high-power, tuned, L-C oscillator circuit.

Reduced to its essential elements, the basic tuned oscillator circuit is shown in schematic form in FIG. 1. As is apparent from FIG. 1, the circuit comprises four primary conduction paths. The first path includes resistor $R_1$ and switch $S_1$; the second path includes switch $S_2$ and resistor $R_2$; the third path includes capacitors $C_1$ and $C_2$; and the fourth path includes the parallel tuned circuit comprised of capacitor $C_0$ and field coil $L_0$. The first and second paths are connected in parallel between bias voltage source V and point of reference potential G. The third path is connected from a circuit point in the first path, located between resistor $R_1$ and switch $S_1$, to a circuit point in the second path, located between switch $S_2$ and resistor $R_2$. The fourth path is connected from reference point G to a circuit point in the third path, located between capacitors $C_1$ and $C_2$.

Figure 2:
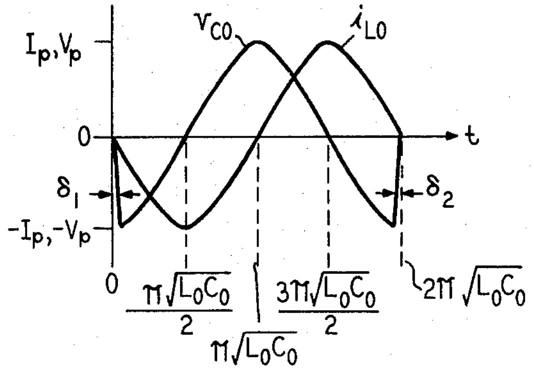
FIG. 2 depicts a temporal plot of the oscillatory voltage and current waveforms produced by the oscillator circuit shown in FIG. 1.

The circuit shown in FIG. 1 generates the oscillatory voltage $v_{CO}$ and current $i_{LO}$ waveforms depicted in FIG. 2 under the following conditions. First, switches $S_1$ and $S_2$ must be biased in normally nonconducting or open states. Second, the magnitude of the bias voltage, hereinafter referred to merely as V, must be (n±1) times the desired amplitude $V_p$ of $v_{CO}$. The value $n$ is the ratio of the value of capacitor $C_O$ to the value of capacitor $C_1$. Third, capacitor $C_2$ must have a value which is $n/(n+1)$ times the value of capacitor $C_1$.

The required bias voltage V may also be expressed iterms of the desired peak amplitude $I_p$ of the oscillatory current $i_{LO}$. $I_p$ is related to the peak amplitude $V_p$ of $v_{CO}$ by the well-known relationship $I_p = V_p/Z$, where $Z$, the ac impedance of coil $L_0$, is equal to $2\pi f L_0$. The term $f$ represents the resonant frequency of the tuned circuit and is equal to $1/(2\pi \sqrt{L_0C_0})$. From these relationships, it is evident that $I_p = V_p \sqrt{C_0/L_0}$ and that the required bias voltage V may be also expressed as $V = (n+1)I_p \sqrt{L_0/C_0}$.

If these conditions are achieved, capacitor $C_1$ will initially charge through resistor $R_1$ and coil $L_0$ to a potential difference $v_{C1}$ equal to bias voltage V. Capacitor $C_0$ will remain normally uncharged due to the effective dc short circuit through coil $L_0$. When switch $S_1$ is rendered conducting, capacitors $C_1$ and $C_0$ are effectively switched into a closed loop and the required oscillation energy is transferred to capacitor $C_0$. As will be recalled, just prior to the closing of switch $S_1$, the voltage $v_{C1}$ across capacitor $C_1$ equaled the bias voltage V and $V = (n+1)V_p$. Consequently, upon the closing of switch $S_1$, the voltage $v_{C0}$ across capacitor $C_0$ suddenly becomes equal to $-V_p$ and the oscillatory current $i_{L0}$ begins to flow in the tuned circuit at approximately the frequency $f = 1/(2\pi \sqrt{L_0C_0})$.

Immediately following the closing of switch $S_1$, the actual frequency $f$ of the oscillatory current $i_{L0}$ is not exactly equal to $1/(2\pi \sqrt{L_0C_0})$, as is assumed above. This is due to the fact that when capacitor $C_1$ is switched into a loop with capacitor $C_0$, the capacitors are effectively connected in parallel with coil $L_0$. The effective capacitance of the tuned circuit is therefore not $C_0$, but $C_1 + C_0 = C_0/n + C_0$. Consequently, the actual resonant frequency $f$ of $i_{L0}$ is not $1/(2\pi \sqrt{L_0C_0})$ but $1/(2\pi\sqrt{(n+1/n) \cdot L_0C_0})$. To avoid this problem, $n$ is usually chosen to be of the order of 10 or more. Hence, in practice, the resonant frequency $f$ of $i_{L0}$ is, nevertheless, primarily determined by capacitor $C_0$. Further, for reasons that will become apparent in the ensuing description, soon after switch $S_1$ is closed to initiate oscillation, the switch is again opened and capacitor $C_1$ is effectively removed from the tuned circuit. Consequently, soon after switch $S_1$ is again opened, the oscillation frequency does in fact become $1/(2\pi \sqrt{L_0C_0})$.

As is apparent from FIG. 2, upon the closing of switch $S_1$, the voltage $v_{CO}$ does not develop instantaneously across capacitor $C_0$, but rather takes a finite rise time $\delta_1$ to build up to its negative peak value $-V_p$. This rise time is primarily determined by the switching time of switch $S_1$. Thus, in order not to distort the oscillatory waveform, the switching time of switch $S_1$ is, in practice, limited to not more than about 1 percent of the period $2\pi\sqrt{L_0C_0}$ of the oscillatory waveform.

The termination of the oscillatory current $i_{L0}$ after an integral number of oscillation cycles is achieved in a manner similar to its initiation. Switch $S_2$ is rendered conducting when the voltage $v_{C0}$ across capacitor $C_0$ is at its negative peak value $-V_p$. When this occurs, as will become evident from the following analysis, all of the oscillation energy is abruptly removed from the tuned circuit and $i_{L0}$ terminates without producing any undesirable transient ringing effects.

As will be recalled, switch $S_2$ is biased in a normally nonconducting or open state. Consequently, capacitor $C_2$ is normally discharged. And, as will be further recalled, capacitor $C_0$ has a value which is $(n+1)$ times that of capacitor $C_2$ and the magnitude of bias voltage V is $(n+1)$ times the peak amplitude $V_p$ of the voltage waveform $v_{C0}$. When switch $S_2$ is closed, the bias voltage divides itself between series-connected capacitors $C_0$ and $C_2$ in a ratio which depends upon their relative values and initial voltages. If the voltage $v_{C0}$ were equal to zero at that instant, and not $-V_p$, capacitor $C_2$ would immediately charge to the voltage $v_{C2} = V\,[\,C_0/(C_0 + C_2)] = V\,[(n+1)/(n+2)]$ and $C_0$ would immediately charge to the voltage $v_{C0} = [\,VC_2\,/(C_0 + C_2)] = [\,V/(n+2)]$. However, since $v_{C0} = -V_p = -V/(n+1)$ just prior to the closing of switch $S_2$, the voltage $v_{C0}$ across capacitor $C_0$ becomes equal to zero and the voltage $v_{C2}$ across capacitor $C_2$ becomes equal to the bias voltage V. As a result, upon the closing of switch $S_2$, the oscillatory current $i_{L0}$ immediately terminates and the voltage $v_{C0}$ abruptly drops from $-V_p$ to a zero value.

As is apparent from FIG. 2, the voltage $v_{C0}$ across capacitor $C_0$ does not change instantaneously but rather has a finite fall time $\delta_2$. If switch $S_2$ is of the same variety as switch $S_1$, this fall time, which is primarily determined by the switching time of $S_2$, will usually be equal to $\delta_1$, the rise time of $v_{C0}$. Thus, the switching times of both $S_1$ and $S_2$ are limited to being less than 10 nsec when oscillation frequencies in the order of 1 MHz are required.

Peak voltage amplitudes ($V_p$) of 100 volts or more are usually required for the voltage waveform $v_{C0}$ when the oscillator circuit is utilized as part of the field drive circuitry in the more sophisticated field-accessed magnetic domain apparatus. An example of such apparatus is the "major-minor loop" mass memory which is shown and described in U.S. Pat. No. 3,618,054, assigned to Bell Telephone Laboratories, Inc. by P. I. Bonyhard, et al. Further, as was pointed out above, in practice, the value of $n$ is usually chosen to be 10 or more to insure that capacitor $C_1$ does not adversely affect the oscillation frequency of $i_{L0}$ in the interval immediately after oscillation is initiated. Thus, in practice, the required bias voltage V ($V=(n+1)V_p$) is usually 1,100 volts or more. As a result, switches $S_1$ and $S_2$ must (1) be capable of switching more than 1,100 volts, (2) be capable of providing switching speeds of less than 10 secs, and (3) be capable of handling the high peak currents which result upon the closing of the switches when the charges on the capacitors quickly redistribute themselves through the switches. Cold cathode switching tubes such as the Krytron tubes shown and described in EG and G, Electronics Products Division, Data Sheet KR-100 (October 1969) are particularly suitable for implementing switches $S_1$ and $S_2$ and meeting these requirements.

Figure 3:
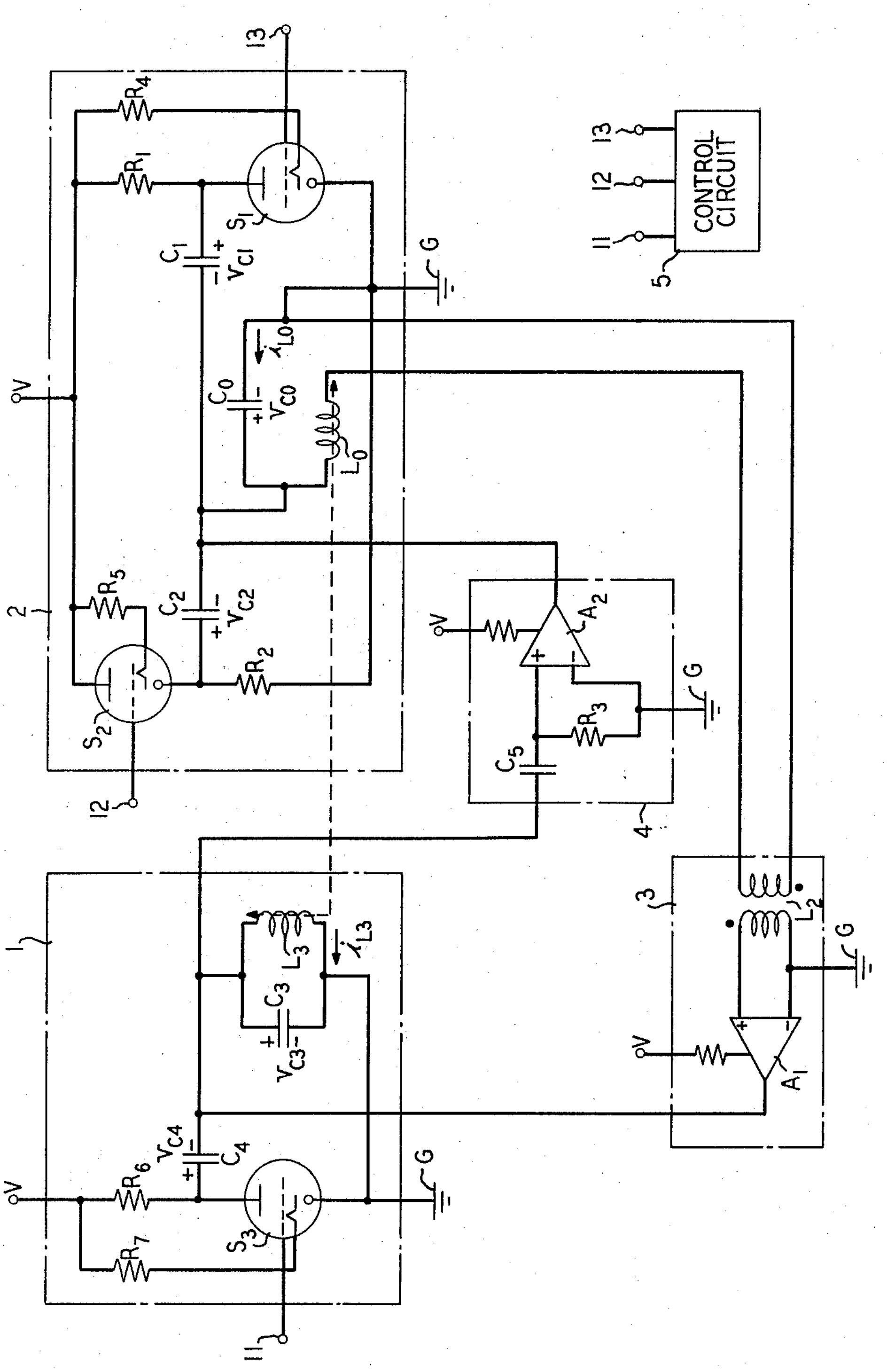
FIG. 3 illustrates a rotating magnetic field drive circuit comprised of the tuned oscillator circuit depicted in FIG. 1.

A circuit for providing an integral number of cycles of an in-plane rotating magnetic field at constant amplitude is depicted in FIG. 3. As is apparent from FIG. 3, the circuit is basically comprised of (1) an oscillator circuit 2 of the type shown in FIG. 1, (2) a modified embodiment (oscillator circuit 1) of the circuit shown in FIG. 1, (3) a circuit 3 for regenerating oscillatory current $i_{L3}$ in oscillator circuit 1, (4) a circuit 4 for regenerating oscillatory current $i_{L0}$ in oscillator circuit 2, and (5) a circuit 5 for controlling the operation of switches $S_1 - S_3$.

As was pointed out above, oscillator circuit 2 is essentially the same oscillator circuit that is depicted in FIG. 1 and described above. The only changes of any consequence are: (1) Krytron tubes are used in oscillator circuit 2 to implement switches $S_1$ and $S_2$; (2) resistors $R_4$ and $R_5$ are included in the circuit for providing currents to the "keep alive" electrodes of the Krytron tubes; and (3) a coil of transformer $L_2$ is included in the tuned circuit for reasons that will become apparent in the following description of the operation of regenerating circuit 3.

Oscillator circuit 1 basically includes (1) a conduction path comprised of a normally nonconducting or open switch $S_3$, illustratively depicted as a Krytron tube, and biasing resistor $R_6$, (2) a parallel tuned circuit comprised of capacitor $C_3$ and field coil $L_3$, (3) a conduction path including capacitor $C_4$ which connects the tuned circuit to a circuit point located between switch $S_2$ and resistor $R_6$ and (4) a conduction path including resistor $R_7$ for providing current to the "keep alive" electrode of switch $S_3$.

The value of the resonant frequency of the oscillatory current in oscillator circuit 1 must be the same as it is in oscillator circuit 2. Consequently, the values of field coil $L_3$ and capacitor $C_3$ are usually chosen to be the same as those of field coil $L_0$ and capacitor $C_0$, respectively, and capacitor $C_4$ is chosen to have the same value as capacitor $C_1$. However, as is schematically shown in FIG. 3, the longitudinal axis of field coil $L_3$ is aligned perpendicularly with respect to the same axis of field coil $L_0$. Hence, the frequency $1/(2\pi\sqrt{L_3C_3})$ of the oscillatory current $i_{L3}$ is the same as the frequency of $i_{L0}$, but the magnetic field component resulting from its passage through field coil $L_3$ is generated at a right angle with respect to the similar component resulting from the passage of $i_{L0}$ through field coil $L_0$. Together these two orthogonal magnetic field components comprise the rotating magnetic field which is generated by the field drive circuit.

Since switch $S_3$ is normally open, capacitor $C_4$ is normally charged to a voltage $v_{C4}$ equal to bias voltage V. When switch $S_3$ is rendered conducting by a positive control pulse provided on lead 11 by control circuit 5, capacitor $C_4$ is effectively switched into a closed loop with capacitor $C_3$. The charge on capacitor $C_4$ then distributes itself between capacitors $C_3$ and $C_4$ in the same way as it does between capacitors $C_0$ and $C_1$ in oscillator circuit 2 when switch $S_1$ is closed, and a voltage $v_{C3}$ equal to $-V_p$ develops across capacitor $C_3$. Assuming that switches $S_1$ and $S_3$ are similar, this voltage takes the finite rise time $\delta_1$ to develop. The oscillatory current $i_{L3}$ then begins to flow in the tuned circuit. Following the termination of the positive pulse on lead 11 soon after oscillation is initiated, switch $S_3$ is again rendered nonconducting.

Switch $S_1$, which is also normally biased in a nonconducting or open state, is rendered conducting by a positive control pulse provided on lead 13 by control circuit 5 when voltage $v_{C3}$ first decreases to zero after one quarter cycle of oscillation. The oscillatory waveforms $v_{C0}$ and $i_{C0}$ are then initiated in the oscillator circuit 2 in the manner described above. Following the termination of the positive pulse, switch $S_1$, like switch $S_3$, is again rendered nonconducting. As is apparent from FIG. 4, the voltage $v_{C0}$ and the current $i_{L0}$ respectively trail the voltage $v_{C3}$ and the current $i_{L3}$ by one quarter cycle or 90° of phase.

In practice, field coils $L_1$ and $L_3$ each include a finite resistance $R_L$. Since the peak amplitudes of $i_{L0}$ and $i_{L3}$ are usually chosen to be the same, it follows that the power lost in each of the tuned circuits of oscillator circuits 1 and 2 due to these resistances is equal to $\frac{1}{2}I_p^2R_L$. Consequently, the oscillatory currents $i_{L0}$ and $i_{L3}$ become damped unless regenerated. Further, in practice, elements having matched values like coils $L_0$ and $L_3$ and capacitors $C_0$ and $C_3$ inevitably have slightly different values. As a result, the one quarter cycle of phase difference between $i_{L0}$ and $i_{L3}$ tends to drift slightly during the course of the oscillation. To remedy these problems, regenerating circuits 3 and 4 are usually cross-coupled between the respective tuned circuits of oscillator circuits 1 and 2. The basic function of these regenerating circuits is to (1) maintain the amplitudes of oscillatory currents $i_{L0}$ and $i_{L3}$ and (2) to synchronize these currents with respect to one another so that $i_{L0}$ always trails $i_{L3}$ by one quarter cycle.

Regenerating circuit 3 may be any of a number of well-known regenerating circuit embodiments. One such embodiment, shown in FIG. 3, is comprised of an amplifier $A_1$ and a current transformer $L_2$. A sample of current $i_{L0}$ is picked off by the coil of transformer $L_2$ which is connected in series with coil $L_3$. The signal is then coupled to amplifier $A_1$. Amplifier $A_1$ is adjusted to inject the precise amount of power ($\frac{1}{2}I_p^2R_L$) to the tuned circuit of oscillator circuit 1 in the correct phase to prevent the amplitude of $i_{L3}$ from decreasing with time and to insure that $i_{L3}$ leads $i_{L0}$ by one quarter cycle. As is apparent from FIG. 3, the 270° of total phase shift provided by transformer $L_2$ (180°) and coil $L_3$ (90°) insures that $i_{L3}$ continues to lead $i_{L0}$ by one quarter cycle.

Alternatively, the inverting input of amplifier $A_1$ could be used in lieu of transformer $L_2$ to provide 180° of the required 270° of phase shift.

Like circuit 3, regenerating circuit 4 may be any one of a number of well-known regenerating circuit embodiments. For instance, the embodiment illustrated for regenerating circuit 3 would also be suitable for regenerating circuit 4. Another embodiment which is suitable for circuit 4 is depicted in FIG. 3. In this embodiment circuit 4 is comprised of two subcircuits. One subcircuit, comprised of capacitor $C_5$ and resistor $R_3$, is effectively a high pass filter at the desired oscillation frequency $1/(2\pi\sqrt{L_3C_3})$. The other subcircuit is amplifier $A_2$, which provides the same amount of power amplification ($\frac{1}{2}I_p^2R_L$) as amplifier $A_1$. When the time constant $R_3C_5$ of the high pass filter is much smaller than the oscillation period $2\pi\sqrt{L_3C_3}$ of $i_{L3}$, the filter effectively shifts the phase of the signal coupled to the positive input of amplifier $A_2$ by 90°. As a result, the circuit not only provides for regeneration of oscillatory current $i_{L0}$ but also insures that it trails $i_{L3}$ by one quarter cycle.

Figure 5:
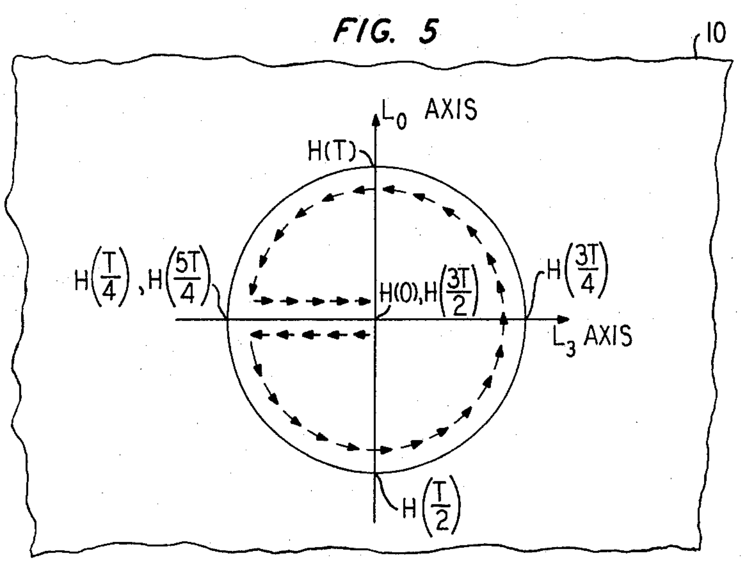
FIG. 5 depicts a temporal plot of the rotating in-plane magnetic field produced by the field drive circuit shown in FIG. 3.

As may be gathered from FIG. 3, unlike oscillator circuit 2, oscillator circuit 1 does not require a second switch in addition to $S_3$ for terminating $i_{L3}$. This advantage results from the fact that it is desirable that the resulting rotating magnetic field H($t$) not have a static or steady state component. FIG. 5 illustrates a temporal plot of one full cycle of the resulting field H($t$) in the plane of layer of material 10. As is apparent from FIGS. 4 and 5, the rotating field takes an interval equal to one quarter of the period T of $i_{L3}$, where $T = 2\pi\sqrt{L_3C_3}$, to reach full strength along the $L_3$ axis upon the initiation of the field and an equal interval to decrease to zero strength upon the termination of the field. Consequently, in order for the field not to have a static component, the oscillatory waveforms $i_{L3}$ and $v_{C3}$ must be initiated one quarter cycle before $i_{L0}$ and $v_{C0}$ and must be terminated one quarter cycle after $i_{L0}$ and $v_{C0}$. $i_{L3}$ and $v_{C3}$ are therefore required to oscillate for a total of one more half cycle than $i_{L0}$ and $v_{C0}$, which oscillate through an integral number N of cycles.

The effect of this requirement is directly responsible for the absence of a second switch in oscillator circuit 1. As may be seen in FIG. 4, the initial and final voltages across capacitor $C_0$ are both the same — $-V_p$. Hence, two switches are required, one ($S_1$) to initiate the oscillation and one ($S_2$) to terminate it. The initial and terminal voltages across capacitor $C_3$ are, however, of the same magnitude $V_p$, but of opposite polarity due to the odd number of half cycles of $v_{C3}$ and $i_{L3}$ which are required to suppress the static component of H(t). Consequently, as will become apparent from the following description of the termination of the rotating field, only a single switch—$S_3$—is required to both initiate and terminate oscillation in oscillator circuit 1.

Figure 4:
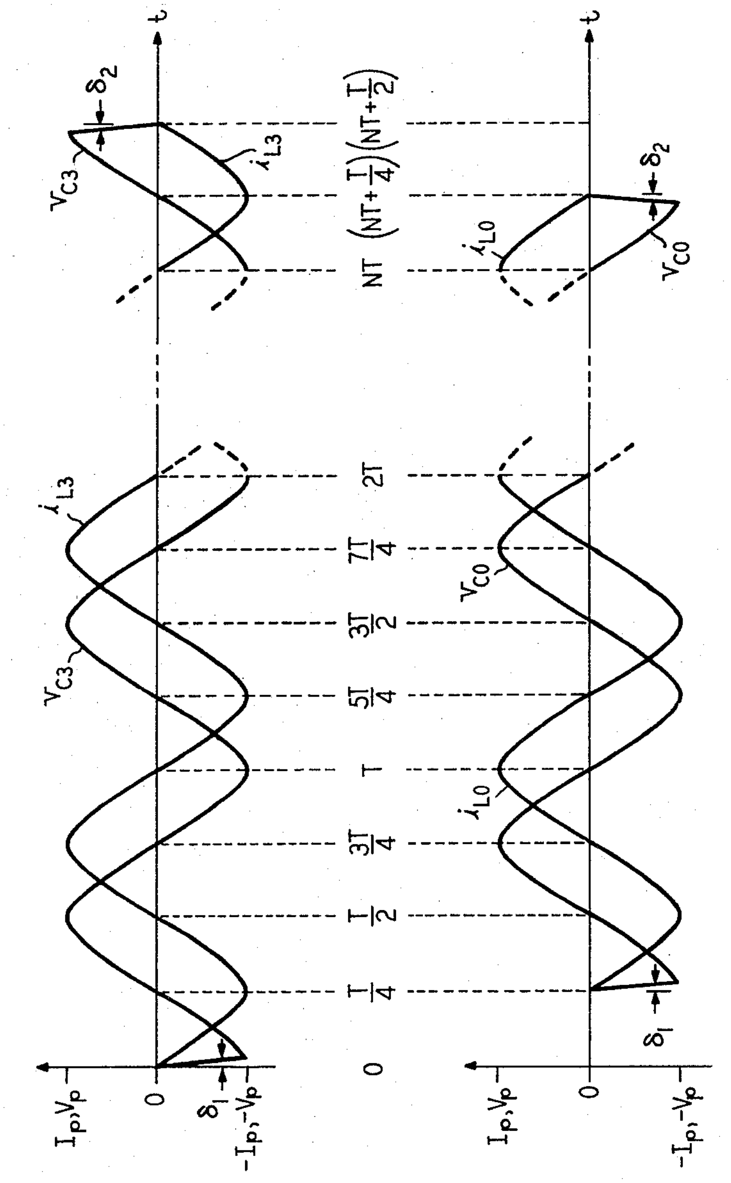
FIG. 4 illustrates a temporal plot of the oscillatory waveforms produced by the oscillator circuits in the field drive circuit shown in FIG. 3.

When it is desired to terminate the rotating magnetic field after an integral number N of rotation cycles, a positive control pulse sufficient to render switch $S_2$ conducting is coupled to the switch by control circuit 5 on lead 12. Referring to FIG. 4, this pulse would occur just prior to the time $t = NT + T/4$. Oscillatory current $i_{L0}$ then terminates at the time $t = NT + T/4$. Oscillatory current $i_{L3}$ is allowed, however, to continue for an additional quarter cycle until the time $t = NT + T/2$ when the voltage $v_{C3}$ across capacitor $C_3$ is equal to $V_p$. Just prior to this time, switch $S_3$ is again rendered conducting by a positive control pulse coupled to lead 11 by control circuit 5.

As will be recalled, switch $S_3$ again became nonconducting shortly after the initiation of $i_{L3}$. Consequently, capacitor $C_4$ thereafter again became charged to a voltage $v_{C4}$ equal to the bias voltage V. Since capacitors $C_3$ and $C_4$ are effectively connected in a closed loop when switch $S_3$ is again rendered conducting, the voltages across the capacitors distribute in approximately the same ratio as they do across $C_2$ and $C_0$ when switch $S_2$ is rendered conducting. As a result, like $i_{L0}$, $i_{L3}$ is terminated without producing any undesirable transient ringing effects.

It should be noted, however, that since capacitor $C_4$, which has a value equal to that of capacitor $C_1$, must perform both the functions of capacitors $C_1$ and capacitor $C_2$, which are of similar but unequal value ($C_2 = n/(n+1)C_1$), the voltage $v_{C3}$ is not exactly reduced to zero upon the closing of $S_3$. Nevertheless, since values of $n$ equal to 10 or more are commonly used, in practice the value of capacitor $C_4$ is sufficiently close to the value of capacitor $C_2$ to insure that the voltage $v_{C3}$ is reduced sufficiently close to zero to justify the use of but a single switch in oscillator circuit 1.

As was pointed out in the foregoing description of the invention, when Krytron tubes are used to implement switches $S_1 - S_3$ control circuit 5 is required to generate on lead 11 positive switching pulses at times $t = 0$ and $t = NT + T/2$. It is similarly required that control circuit 5 generate on lead 13 a positive switching pulse at time $t = T/4$ and to generate on lead 12 a positive switching pulse at time $t = NT + T/4$. Inasmuch as a number of well-known timing circuits capable of generating such pulses are shown and described in Millman and Taub, *Pulse, Digital, and Switching Waveforms* (McGraw-Hill, 1965) and a number of other well-known circuit references, the details of control circuit 5 will not be described herein.

Although the present invention has been described in connection with particular applications and embodiments thereof, it is intended that all additional modifications, applications and embodiments which will be apparent to those skilled in the art in light of the teachings of the invention be included within the spirit and scope of this disclosure.

What is claimed is:

1. An oscillator circuit comprising:

a tuned circuit, first means for storing a first predetermined amount of energy, second means for storing a second predetermined amount of energy, first means for transferring said first predetermined amount of energy to said first storing means, second means for transferring from said first storing means to said tuned circuit an amount of energy sufficient to initiate an oscillatory current of a predetermined frequency, amplitude and phase in said tuned circuit, and third means for transferring from said tuned circuit to said second storing means an amount of energy sufficient to terminate said oscillatory current at a predetermined phase point without producing undesirable transient ringing effects.

2. The oscillator circuit in accordance with claim 1 in which said tuned circuit includes a capacitor and a coil, said first storing means includes a first capacitor for storing said first predetermined amount of electrical energy, said second storing means includes a second capacitor for storing at least the amount of electrical energy sufficient to terminate said oscillatory current without producing transient ringing effects, said first transferring means includes a bias voltage source and a first resistor for charging said first capacitor, said second transferring means includes a first switch for connecting said first capacitor and said tuned circuit in a loop, and said third transferring means includes a second resistor and a second switch for connecting said tuned circuit and said second capacitor to said bias voltage source.

3. The oscillator circuit in accordance with claim 2 in which said tuned circuit capacitor has a value which is $n$ times the value of said first capacitor, where $n$ is a predetermined positive number, said tuned circuit capacitor has a value which is $(n+1)$ times the value of said second capacitor, and said bias voltage source provides a bias voltage which is $(n+1)$ times the peak voltage amplitude produced across said tuned circuit capacitor by said oscillatory current.

4. The oscillator circuit in accordance with claim 2 in which said first resistor and said first switch are serially connected in a first circuit path, said second switch and said second resistor are serially connected in a second circuit path which is connected in parallel with said first path between said bias voltage source and a point of reference potential, said first capacitor and said second capacitor are serially connected in a third circuit path which is connected between a circuit point in said first path located between said first resistor and said first switch and a circuit point in said second path located between said second resistor and said second switch, and said tuned circuit capacitor and said tuned circuit coil are connected in parallel between said point of reference potential and a circuit point in said third path located between said first and second capacitors.

5. The tuned oscillator circuit in accordance with claim 4 in which said second switch is connected between said bias voltage source and said second resistor, and said first resistor is connected between said bias voltage source and said first switch.

6. The tuned oscillator circuit in accordance with claim 2 in which said first and second switches are electronic switches which are biased in normally nonconducting states, said oscillatory current is initiated by rendering said first switch conducting, and said oscillatory current is terminated after an integral number of oscillation cycles by rendering said second switch conducting when the oscillatory voltage developed across said tuned circuit capacitor by said oscillatory current reaches its peak amplitude and has a polarity which is opposite that of said bias voltage.

7. A rotating field drive circuit comprising a first oscillator circuit which includes a first tuned circuit comprising a capacitor and a field coil, first means for storing a first predetermined amount of energy, second means for storing a second predetermined amount of energy, first means for transferring said first predetermined amount of energy to said first storing means, second means for transferring from said first storing means to said first tuned circuit an amount of energy sufficient to initiate a first oscillatory current of a predetermined frequency, amplitude and phase in said first tuned circuit, and third means for transferring from said first tuned circuit to said second storing means an amount of energy sufficient to terminate said first oscillatory current at a predetermined phase point without producing transient ringing effects, and a second oscillator circuit which includes a second tuned circuit comprising a capacitor and a field coil, third means for storing a third predetermined amount of energy, fourth means for transferring said third predetermined amount of energy to said third storing means, fifth means for transferring from said third storing means to said second tuned circuit an amount of energy sufficient to initiate a second oscillatory current of a predetermined frequency, amplitude and phase in said second tuned circuit and for transferring an amount of energy from said second tuned circuit to said third storing means sufficient to terminate said second oscillatory current without producing substantial transient ringing effects.

8. The rotating field drive circuit in accordance with claim 7 in which said first storing means includes a first capacitor for storing said first amount of energy, said second storing means includes a second capacitor for storing at least the amount of energy which is transferred from said first tuned circuit to terminate said first oscillatory current, said third storing means includes a third capacitor for storing at least said third predetermined amount of energy, said first transferring means includes a bias voltage source and a first resistor for charging said first capacitor, said second transferring means includes a first switch for connecting said first capacitor and said first tuned circuit in a loop, said third transferring means includes a second resistor and a second switch for connecting said first tuned circuit and said second capacitor to said bias voltage source, said fourth transferring means includes a third resistor for connecting said bias voltage source to said third capacitor, and said fifth transferring means includes a third switch for connecting said third capacitor and said second tuned circuit in a loop.

9. The field drive circuit in accordance with claim 8 in which
said first tuned circuit capacitor has a value which is $n_1$ times the value of said first capacitor, where $n_1$ is a predetermined positive number,
said second tuned circuit capacitor has a value which is $n_2$ times the value of said third capacitor, where $n_2$ is a predetermined positive number,
said first tuned circuit capacitor has a value which is $(n_1+1)$ times the value of said second capacitor, and
said bias voltage source provides a bias voltage which is $(n_1+1)$ times the peak voltage amplitude produced across said first tuned circuit capacitor by said first oscillatory current and which is $(n_2+1)$ times the peak voltage amplitude produced across said second tuned circuit capacitor by said second oscillatory current.

10. The field drive circuit in accordance with claim 9 in which $n_1$ equals $n_2$.

11. The field drive circuit in accordance with claim 8 in which the oscillation frequencies of said first and second oscillatory currents are substantially the same.

12. The field drive circuit in accordance with claim 11, such circuit further comprising regenerating means, connected between said first and second tuned circuits, for maintaining said first and second oscillatory currents at a constant amplitude and for insuring that said first current trails said second current by one quarter cycle.

13. The field drive circuit in accordance with claim 11 in which the axes of said field coils in said first and said second tuned circuits are arranged in a plane to produce two orthogonal magnetic field components which comprise an in-plane magnetic field that rotates at the frequency of said oscillatory currents.

14. The field drive circuit in accordance with claim 13 in which
said first, second and third switches are electronic switches which are biased in normally nonconducting states,
said second oscillatory current is initiated by rendering said third switch momentarily conducting,
said first oscillatory current is initiated one quarter cycle after the initiation of said second current by rendering said first switch momentarily conducting,
said first current is terminated after an integral number of oscillation cycles by rendering said second switch momentarily conducting when the oscillatory voltage across said first tuned circuit capacitor, measured with respect to said bias voltage, reaches its peak amplitude and has a polarity which is opposite that of said bias voltage, and
said second current is terminated after an odd number of half oscillation cycles by rendering said third switch momentarily conducting one quarter cycle after the termination of said first current when the oscillatory voltage across said second tuned circuit capacitor, measured with respect to said bias voltage, reaches its peak amplitude and has the same polarity as said bias voltage, whereby the resultant rotating in-plane magnetic field terminates itself at its initial phase point without a static component after an integral number of rotation cycles.

15. The field drive circuit in accordance with claim 8 in which
said first resistor and said first switch are serially connected in a first circuit path,
said second resistor and said second switch are serially connected in a second circuit path which is connected in parallel with said first path between said bias voltage source and a point of reference potential,
said first and second capacitors are serially connected in a third circuit path which is connected between a circuit point in said first path located between said first resistor and said first switch and a circuit point in said second path located between said second resistor and said second switch,
said first tuned circuit capacitor and said first tuned circuit coil are connected in parallel between said point of reference potential and a circuit point in said third path located between said first and second capacitors,
said third resistor and said third switch are serially connected in a fifth circuit path which is connected between said bias voltage source and said point of reference potential, and
said third capacitor and a parallel combination of said second tuned circuit capacitor and said second tuned circuit coil are serially connected in a sixth circuit path which is connected between said point of reference potential and a circuit point in said fifth path located between said third resistor and said third switch.

16. The field drive circuit in accordance with claim 15 in which
said first resistor is connected in said first path between said bias voltage source and said first switch,
said second switch is connected in said second path between said bias voltage source and said second resistor, and
said third resistor is connected in said fifth path between said bias voltage source and said third switch.

17. The field drive circuit in accordance with claim 15, such circuit further comprising first and second regenerating circuits,
said first regenerating circuit, connected from said point of reference potential to a circuit point in said sixth path located between said third capacitor and said second tuned circuit, including a first amplifier circuit and a transformer, and
said second regenerating circuit, connected from a circuit point in said sixth path located between said third capacitor and said second tuned circuit to a circuit point in said third path located between said first and second capacitors, including a second amplifier circuit and a high pass filter.

* * * * *